(12) United States Patent
Van Beek et al.

(10) Patent No.: US 8,264,614 B2
(45) Date of Patent: Sep. 11, 2012

(54) SYSTEMS AND METHODS FOR VIDEO PROCESSING BASED ON MOTION-ALIGNED SPATIO-TEMPORAL STEERING KERNEL REGRESSION

(75) Inventors: Petrus J. L. Van Beek, Camas, WA (US); Hiroyuki Takeda, Santa Cruz, CA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1274 days.

(21) Appl. No.: 12/016,119

(22) Filed: Jan. 17, 2008

(65) Prior Publication Data
US 2009/0185078 A1      Jul. 23, 2009

(51) Int. Cl.
H04N 9/64       (2006.01)
H04N 5/21       (2006.01)

(52) U.S. Cl. ........................................ 348/620; 348/618

(58) Field of Classification Search ........................ None
See application file for complete search history.

(56) References Cited

U.S. PATENT DOCUMENTS

| | | | |
|---|---|---|---|
| 5,796,879 A | | 8/1998 | Wong et al. |
| 6,438,275 B1 * | | 8/2002 | Martins et al. ............... 382/300 |
| 6,975,359 B2 | | 12/2005 | Jiang |
| 2004/0252759 A1 * | | 12/2004 | Winder et al. ........... 375/240.12 |
| 2007/0047838 A1 | | 3/2007 | Milanfar et al. |

FOREIGN PATENT DOCUMENTS

| | | |
|---|---|---|
| EP | 1096424 | 5/2001 |
| WO | 2006010105 | 1/2006 |
| WO | 2007027893 | 3/2007 |

OTHER PUBLICATIONS

Hiroyuki Takeda, Sina Farsiu, Peyman Milanfar, Kernel Regression for Image Processing and Reconstruction, Feb. 2007, IEEE, vol. 16 No. 2, pp. 350-365.*
S.C. Park, M.K. Park, M.G. Kang, "Super-resolution image reconstruction: a technical overview," IEEE Signal Processing Magazine, V. 20, No. 3, May 2003, pp. 21-36.
S. Farsiu, D. Robinson, M. Elad, P. Milanfar, "Advances and Challenges in Super-Resolution," Int. Journal of Imaging Systems and Technology, V. 14, No. 2, Aug. 2004, pp. 47-57.
G. de Haan, "Video scanning format conversion and motion estimation," in: Digital Signal Processing Handbook, eds. V.K. Madisetti and D.B. Williams, CRC Press, 1998, chapter 54.
H. Takeda, S. Farsiu, P. Milanfar, "Kernel Regression for Image Processing and Reconstruction," IEEE Transactions on Image Processing, V. 16, No. 2, Feb. 2007, pp. 349-366.
H. Takeda, "Nonparametric kernel regression methods for image processing and reconstruction," Qualifying Exam Presentation, University of California, Santa Cruz, May 2007.
C. Stiller, J. Konrad, "Estimating motion in image sequences," IEEE Signal Processing Magazine, V. 16, No. 4, Jul. 1999, pp. 70-91.
J.L. Barron, D.J. Fleet, S.S. Beauchemin, "Performance of Optical flow techniques," International Journal of Computer Vision, vol. 12, No. 1, pp. 43-77, 1994.

* cited by examiner

*Primary Examiner* — Vivek Srivastava
*Assistant Examiner* — Rong Le
(74) *Attorney, Agent, or Firm* — Austin Rapp & Hardman

(57) ABSTRACT

A method for video processing based on motion-aligned spatio-temporal steering kernel regression may include estimating local spatio-temporal steering parameters at pixels in input video data. The method may also include using the local spatio-temporal steering parameters to apply motion-aligned spatio-temporal steering kernel regression to the input video data to perform at least one of upscaling and noise smoothing.

18 Claims, 11 Drawing Sheets

SYSTEMS AND METHODS FOR VIDEO PROCESSING BASED ON MOTION-ALIGNED SPATIO-TEMPORAL STEERING KERNEL REGRESSION

TECHNICAL FIELD

The present disclosure relates generally to computers and computer-related technology. More specifically, the present disclosure relates to a framework for processing video signals, i.e., digital image sequences.

BACKGROUND

Currently, very high resolution flat-panel display devices are being developed and brought to market. One example is liquid crystal display (LCD) devices with 4K×2K resolution (2160 lines and 4096 pixels/line). Such display devices are exceeding the highest spatial resolution of video content commonly available, namely 1080 p high definition video (1080 lines and 1920 pixels/line). Thus, it may be desirable to use image and video upscaling or spatial format conversion methods in such display devices.

Recent display devices may also be capable of and benefit from higher frame rates or increased temporal resolution, such as 50, 60, 72, 96 or 120 frames per second. Again, such very high frame rates may exceed the highest frame rate of video content commonly available (24, 25, 30, 50 or 60 frames per second). This highlights the usefulness of temporal video upscaling or temporal video frame rate conversion methods.

Generally, the goals in achieving video interpolation and reconstruction are to enhance or increase the resolution of the input video in a manner that is visually pleasing and artifact-free. Common visual artifacts that may occur in spatial upscaling are edge jaggyness, ringing on edge contours, blurring of edges and blurring of texture detail. Common visual artifacts that may occur in temporal upscaling are motion blur, judder, temporal instability and other motion artifacts. In addition, the input video often may already contain artifacts, for example due to coding and compression or due to other processing stages generally preceding the final processing for display. Therefore, another goal is to avoid amplifying such artifacts in the input signal, and possibly to remove such artifacts.

Due to changing viewing conditions (e.g., closer viewing distances, darker surroundings), as well as incorporation of new display technologies (e.g., higher brightness, wider color gamut) in modern flat-panel display devices, any artifacts in the input video as well as any additional artifacts that may be introduced by the scaling or conversion method used are becoming more visible than in the past. This highlights the usefulness of high-quality scaling and format conversion methods as well as other video processing methods, such as noise suppression.

DETAILED DESCRIPTION

Figure 1:
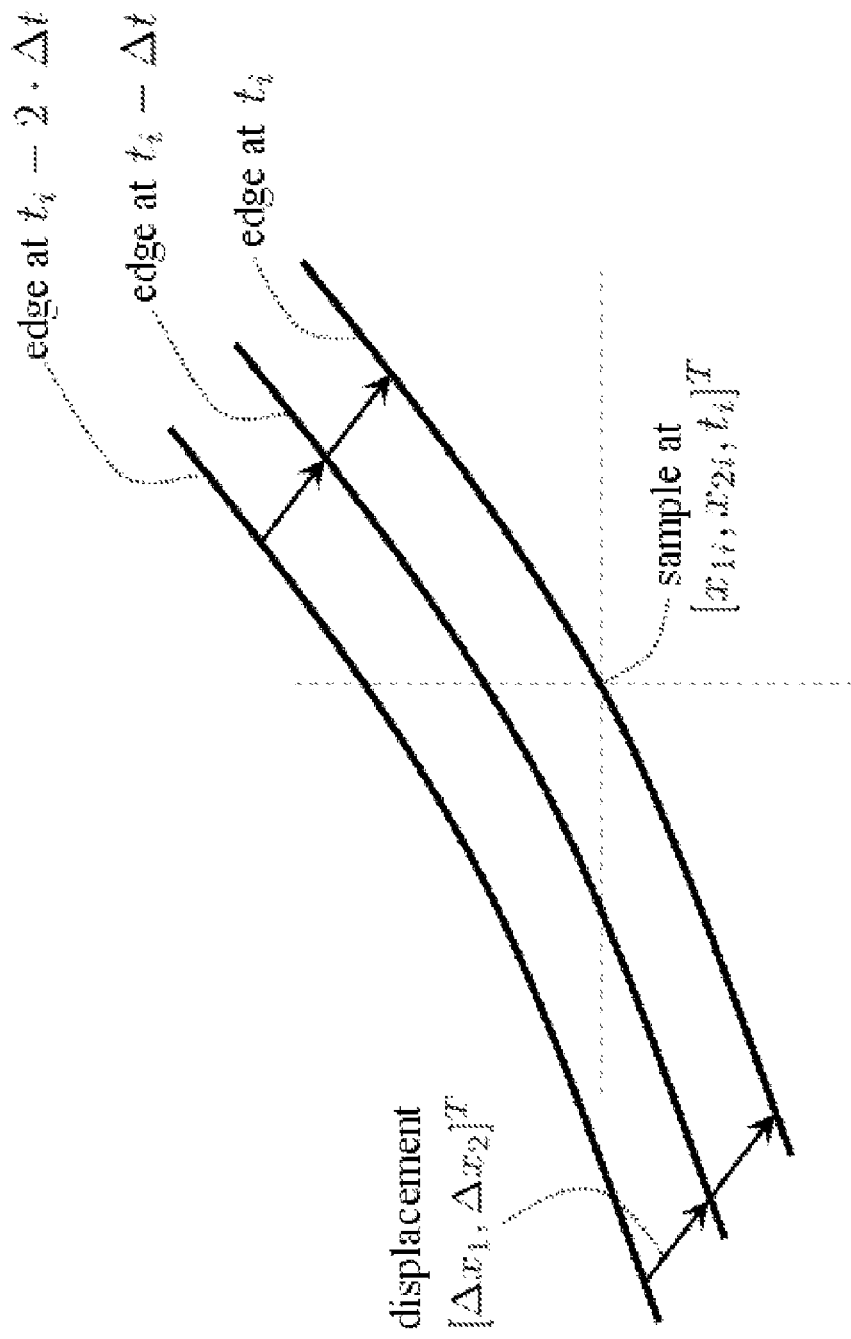
FIG. 1 illustrates a moving edge contour at time $t_i$, time $t_i-\Delta t$ and time $t_i-2\cdot\Delta t$.

A method for video processing based on motion-aligned spatio-temporal steering kernel regression is disclosed. The method may include estimating local spatio-temporal steering parameters at pixels in input video data, and using the local spatio-temporal steering parameters to apply motion-aligned spatio-temporal steering kernel regression to the input video data to perform at least one of upscaling and noise suppression.

Applying the motion-aligned spatio-temporal steering kernel regression to the input video data may include determining steering kernel functions. The steering kernel functions may be based on the local spatio-temporal steering parameters. Applying the motion-aligned spatio-temporal steering kernel regression to the input video data may also include determining equivalent steering kernel functions for pixels in the input video data. The equivalent steering kernel functions may be based on the steering kernel function and also based on a regression order. Applying the motion-aligned spatio-temporal steering kernel regression to the input video data may also include performing local spatio-temporal filtering of the pixels in the input video data using the equivalent steering kernel functions.

Estimating the local spatio-temporal steering parameters may include estimating at least one spatial steering parameter, and estimating at least one motion steering parameter. The spatial steering parameter(s) may include an angle parameter, elongation parameters, and a scaling parameter. The motion steering parameter(s) may include a local motion vector and a temporal scaling parameter.

The method may also include estimating spatial derivatives. Spatial steering parameter estimation and motion steering parameter estimation may both depend on the spatial derivatives.

The method may also include estimating temporal derivatives. Motion steering parameter estimation may depend on the temporal derivatives.

The input video data may include multiple color components. In this situation, the motion-aligned spatio-temporal steering kernel regression may be applied to each of the color components separately.

As indicated above, the local spatio-temporal steering parameters may be used to apply motion-aligned spatio-temporal steering kernel regression to the input video data to perform upscaling. The upscaling may be (i) spatial upscaling, (ii) temporal upscaling, or (iii) simultaneous spatial and temporal upscaling.

A computer system for video processing based on motion-aligned spatio-temporal steering kernel regression is also disclosed. The computer system includes a processor and memory in electronic communication with the processor. Instructions are stored in the memory. The instructions may be executable to estimate local spatio-temporal steering parameters at pixels in input video data, and use the local spatio-temporal steering parameters to apply motion-aligned spatio-temporal steering kernel regression to the input video data to perform at least one of upscaling and noise suppression.

A computer-readable medium is also disclosed. The computer-readable medium may include executable instructions for estimating local spatio-temporal steering parameters at pixels in input video data, and using the local spatio-temporal steering parameters to apply motion-aligned spatio-temporal steering kernel regression to the input video data to perform at least one of upscaling and noise suppression.

As indicated above, the present disclosure relates to a framework for processing video signals, i.e., digital image sequences. More specifically, the present disclosure relates to a class of video processing methods that can be referred to as multi-frame or inter-frame (or inter-field) methods, where data from multiple fields/frames of the input video is used to generate each output frame. Using multiple fields/frames of the input video for spatial upscaling may enable improvement of the resolution of the video. Improvement or enhancement of image resolution may be referred to as super-resolution reconstruction.

The present disclosure relates to solutions for interpolation and reconstruction of video signals that may be degraded by noise, blurring and sampling effects. Interpolation may include upscaling in any of the individual spatial and temporal dimensions of the video signal as well as in a joint spatio-temporal manner. Reconstruction may include suppression of noise, such as independent and identically-distributed (i.i.d.) Gaussian noise, as well as compression artifacts, and other types of noise.

Digital video is a specific type of three-dimensional (3-D) data consisting of a series of two-dimensional (2-D) images, also called video frames and/or fields, where the third dimension is associated with time. Interpolation of digital video may include spatial upscaling, temporal upscaling, and spatio-temporal upscaling.

Spatial upscaling refers to interpolation along the spatial dimensions of each video frame. For example, each video frame with M×N pixels may be spatially upscaled by a factor k, so that each output frame has kM×kN pixels. Spatial upscaling may alternatively be referred to as image zooming or image expansion.

Temporal upscaling refers to interpolation along the temporal dimension of the sequence of video frames, thereby creating new, intermediate, video frames. An example of temporal upscaling is converting a video sequence with 30 frames per second (fps) to a 60 fps video sequence. Temporal upscaling may alternatively be referred to as frame rate conversion.

Spatio-temporal upscaling refers to a combination of both spatial and temporal upscaling. One example of spatio-temporal upscaling is upscaling each video frame by an integer factor combined with frame rate conversion by an integer factor. Another example of spatio-temporal upscaling is de-interlacing, where the spatial and temporal interpolation are inherently inseparable.

The present disclosure relates to a method for upscaling video using input data from multiple frames, in such a manner that the spatial resolution can be improved (i.e., achieving super-resolution). The present disclosure also relates to a method for upscaling video that performs spatial upscaling as well as temporal upscaling, i.e., increasing both spatial and temporal resolution. The present disclosure also relates to a method for upscaling video that is capable of suppressing or removing noise and artifacts from the input video. The present disclosure also describes how all of these goals may be achieved with a single algorithm.

The present disclosure extends a 2-D image processing framework to a spatio-temporal (3-D) video processing framework. This framework is based on steering kernel regression. A spatio-temporal steering kernel is introduced, based on motion-aligning, elongating and scaling a generic kernel. Application of steering kernel regression to upscaling of video based on the proposed spatio-temporal steering kernel is also described.

Steering kernel regression may enable local adaptation of the interpolation process. This may exploit the local structure or local correlation between pixels in each video frame and across frames. Spatio-temporal steering kernel regression may achieve this while avoiding explicit motion compensation. An advantage of motion-aligned spatio-temporal steering kernel regression may be that it avoids visual artifacts due to intermediate interpolation of pixel values or rounding of motion displacements to grid locations, which are common in motion compensation.

Utilizing data from multiple video frames may have important advantages for video upscaling/interpolation as well as video de-noising. For example, it may be possible to achieve resolution reconstruction in spatial interpolation by the multi-frame methods described herein. Furthermore, by utilizing appropriate data from multiple frames, the methods described herein may be able to avoid introduction of spatial blur. In addition, it may be possible for high-quality temporal interpolation to be achieved by the multi-frame methods described herein. Furthermore, it may be possible to reduce the amount of noise in the data, while avoiding introduction of spatial blur, by temporal noise filtering.

As indicated above, the present disclosure relates to motion-aligned spatio-temporal steering kernel regression. Initially, a mathematical description of spatio-temporal kernel regression will be provided. Then, data-adaptive spatio-temporal kernel regression will be described, and 2-D data-adaptive kernel regression will be extended to the spatio-temporal (3-D) case. In particular, a description of motion-aligned spatio-temporal steering kernel regression will be provided. Finally, various systems and methods for spatio-temporal video processing based on motion-aligned spatio-temporal steering kernel regression will be described.

For spatio-temporal video processing, a spatio-temporal data model may be defined as:

$$y_i = z(x_i) + \epsilon_i, \ i=1,\ldots,P, \ x_i = [x_{1i}, x_{2i}, t_i]^T, \quad (1)$$

where $y_i$ is a given noisy sample (i.e., pixel value) at pixel location $x_i$, $x_{1i}$ and $x_{2i}$ are the spatial coordinates, $t_i$ is the temporal coordinate, $z(\cdot)$ is the (hitherto unspecified) regression function $t_i$ be estimated, $\epsilon_i$ is independent and identically-distributed (i.i.d.) zero mean noise, and P is the number of samples in a spatio-temporal neighborhood of interest. This spatio-temporal neighborhood in the video data may include samples, i.e., pixels, from multiple video frames. This model supports a rich framework for computing point-wise estimates of the underlying function z(•) with minimal assumptions about global signal or noise models. The same model can be used for other types of three-dimensional (3-D) data, such as 3-D volumetric data, in which case it may be more appropriate to use the generic notation $x_i=[x_{1i},x_{2i},x_{3i}]^T$, i.e., replacing $t_i$ by $x_{3i}$.

With the spatio-temporal data model represented by equation (1), the goal may be to estimate the value of the regression function z(•) at a point x, given the above data samples $y_i$. While the specific form of z(•) may remain unspecified, it is possible to rely on a generic local expansion of the function about the point x. Specifically, if $x_i$ is near the sample at x, the (N+1)-term Taylor series may be given as:

$$z(x_i) = z(x) + \{\nabla z(x)\}^T(x_i - x) + \frac{1}{2}(x_i - x)^T\{\mathcal{H}z(x)\}(x_i - x) + \ldots \quad (2)$$
$$= \beta_0 + \beta_1^T(x_i - x) + \beta_2^T vech\{(x_i - x)(x_i - x)^T\} + \ldots$$

where $\nabla$ and $H$ are the spatio-temporal gradient (3×1) and spatio-temporal Hessian (3×3) operators, respectively, and vech(•) is the half-vectorization operator which lexicographically orders the lower triangular portion of a symmetric matrix into a column-stack vector. Note that x is the location of the sample (pixel) of interest. Furthermore, $\beta_0$ is z(x), which is the pixel value of interest, the vector $\beta_1$ contains first-order partial derivatives of z(•), and $\beta_2$ contains second-order partial derivatives of z(•):

$$\beta_1 = \left[\frac{\partial z(x)}{\partial x_1}, \frac{\partial z(x)}{\partial x_2}, \frac{\partial z(x)}{\partial t}\right]^T, \quad (3)$$
$$\beta_2 = \left[\frac{\partial^2 z(x)}{\partial x_1^2}, \frac{\partial^2 z(x)}{\partial x_1 \partial x_2}, \frac{\partial^2 z(x)}{\partial x_1 \partial t}, \frac{\partial^2 z(x)}{\partial x_2^2}, \frac{\partial^2 z(x)}{\partial x_2 \partial t}, \frac{\partial^2 z(x)}{\partial t^2}\right]^T.$$

Again, $\beta_0$ is the pixel value that is being estimated, corresponding to an interpolated pixel value in case the original data did not have a sample at x, or to a reconstructed pixel value in case the original data already had a sample at x, possibly degraded by noise. The first and second partial derivatives at x, contained in the vectors $\beta_1$ and $\beta_2$, can also be estimated as part of the process. Note that alternative representations—other than the Taylor series—are possible and may be advantageous.

When estimating $\{\beta_n\}_{n=0}^N$ from the given samples $\{y_i\}_{i=1}^P$, it may be advantageous to give the nearby samples higher weights than samples farther away, resulting in a local signal representation. A weighted least-squares formulation of the fitting problem capturing this idea is to solve the following optimization problem:

$$\min_{\{\beta_n\}_{n=0}^N} \sum_{i=1}^P [y_i - \beta_0 - \beta_1^T(x_i - x) - \beta_2^T vech\{(x_i - x)(x_i - x)^T\} - \ldots]^2 \quad (4)$$

$$K_H(x_i - x) = \frac{1}{\det(H)} K(H^{-1}(x_i - x)), \quad (5)$$

where N is the regression order, K(•) is a kernel function (a radially symmetric function), and H is a (3×3) smoothing matrix which dictates the "footprint" of the kernel function. The influence of H on K will be discussed in more detail later.

The kernel function K(•) weights the influence of each sample (i.e., each pixel). The particular form of the kernel function can be chosen suitably. For example, a Gaussian function may be chosen as a basis for the kernel function. As another example, a rectangular function may be chosen as a prototype for the kernel function. Furthermore, combinations of specific 1-D functions may be chosen to form a spatio-temporal kernel function in multiple dimensions.

It is possible to express equation (4) in matrix form as a weighted least-squares optimization problem:

$$\hat{b} = \arg\min_b \|y - X_x b\|_{W_x}^2 \quad (6)$$
$$= \arg\min_b \{(y - X_x b)^T W_x (y - X_x b)\},$$

$$y = \lfloor y_1, y_2, \ldots, y_P \rfloor^T, \quad b = [\beta_0, \beta_1^T, \ldots, \beta_N^T]^T, \quad (7)$$

$$W_x = diag[K_H(x_1 - x), K_H(x_2 - x), \ldots, K_H(x_P - x)], \quad (8)$$

$$X_x = \begin{bmatrix} 1 & (x_1 - x)^T & vech^T\{(x_1 - x)(x_1 - x)^T\} & \cdots \\ 1 & (x_2 - x)^T & vech^T\{(x_2 - x)(x_2 - x)^T\} & \cdots \\ \vdots & \vdots & \vdots & \vdots \\ 1 & (x_P - x)^T & vech^T\{(x_P - x)(x_P - x)^T\} & \cdots \end{bmatrix} \quad (9)$$

with "diag" defining a diagonal matrix. Note that the vector y contains the given data samples from a spatio-temporal neighborhood, a window that spans multiple video frames and contains multiple pixels for each frame.

This approach effectively approximates the local pixel data by a polynomial up to order N. This results in estimates of the value of the regression function and its derivatives at the point x. The primary interest is often to compute estimates of the image (pixel values) alone. In this case, the computations may be limited to the ones that estimate $\beta_0=z(x)$. Regardless of the regression order and the dimensionality of the regression function, this least-squares estimator may be specified by:

$$\hat{z}(x) = \hat{\beta}_0 = e_1^T (X_x^T W_x X_x)^{-1} X_x^T W_x y, \quad (10)$$

where $e_1$ is a column vector with the first element equal to one and the rest equal to zero. The estimate of the pixel value of interest results directly from the ($N^{th}$ order) local polynomial approximation.

The estimation process of equation (10) can also be written as:

$$\hat{z}(x) = \sum_{i=1}^P W_i(x; K, H, N) y_i, \quad (11)$$

where $W_i(\bullet)$ may be called the "equivalent" kernel function. This function is based on the kernel function K(•), but it also takes into account the regression order N. This expression illustrates that kernel regression is a local weighted averaging or filtering process. This allows for efficient implementations.

A mathematical description of spatio-temporal kernel regression has just been provided. Next, data-adaptive spatio-temporal kernel regression will be described, and 2-D data-adaptive kernel regression will be extended to the spatio-temporal (3-D) case.

With data-adaptive spatio-temporal kernel functions, the kernel K is locally adapted to the data, based on an analysis of the samples in a local neighborhood. Subsequently, data samples that are believed to be highly correlated to the sample to be estimated are given relatively higher weights, while data samples that are believed to be less correlated to the sample of interest are given lower weights. This may result in greatly improved estimates of interpolated or reconstructed sample (pixel) values.

As indicated above, the present disclosure relates to motion-aligned spatio-temporal steering kernel regression. The motion-aligned steering kernel described herein is designed specifically for spatio-temporal video data. A good choice for steering spatio-temporally may be to consider local motion or optical flow vectors caused by object motion in the scene, in conjunction with spatial steering along local edges and isophotes. It may be desirable for spatial steering to consider the locally dominant orientation of the pixel data and to allow elongation of the kernel in this direction, as well as overall spatial scaling. It may be desirable for spatio-temporal steering to allow alignment with the local optical flow or motion trajectory, as well as overall temporal scaling.

Referring to FIG. 1, consider an edge contour or isophote that is moving at constant velocity $m_i=[m_{1i},m_{2i}]^T$. The contour is shown at time $t_i$, intersecting the sample (pixel) at $x_i=[x_{1i},x_{2i},t_i]^T$, and is shown at two previous instances, at time $t_i-\Delta t$ and at time $t_i-2\cdot\Delta t$. These three time instances may correspond to three video frames in a video sequence. Note that later frames may also be available, but were not included in the diagram for simplicity. This illustrates the usefulness of a kernel that is locally aligned with the motion trajectory as well as oriented along spatial edge contours.

Figure 2:
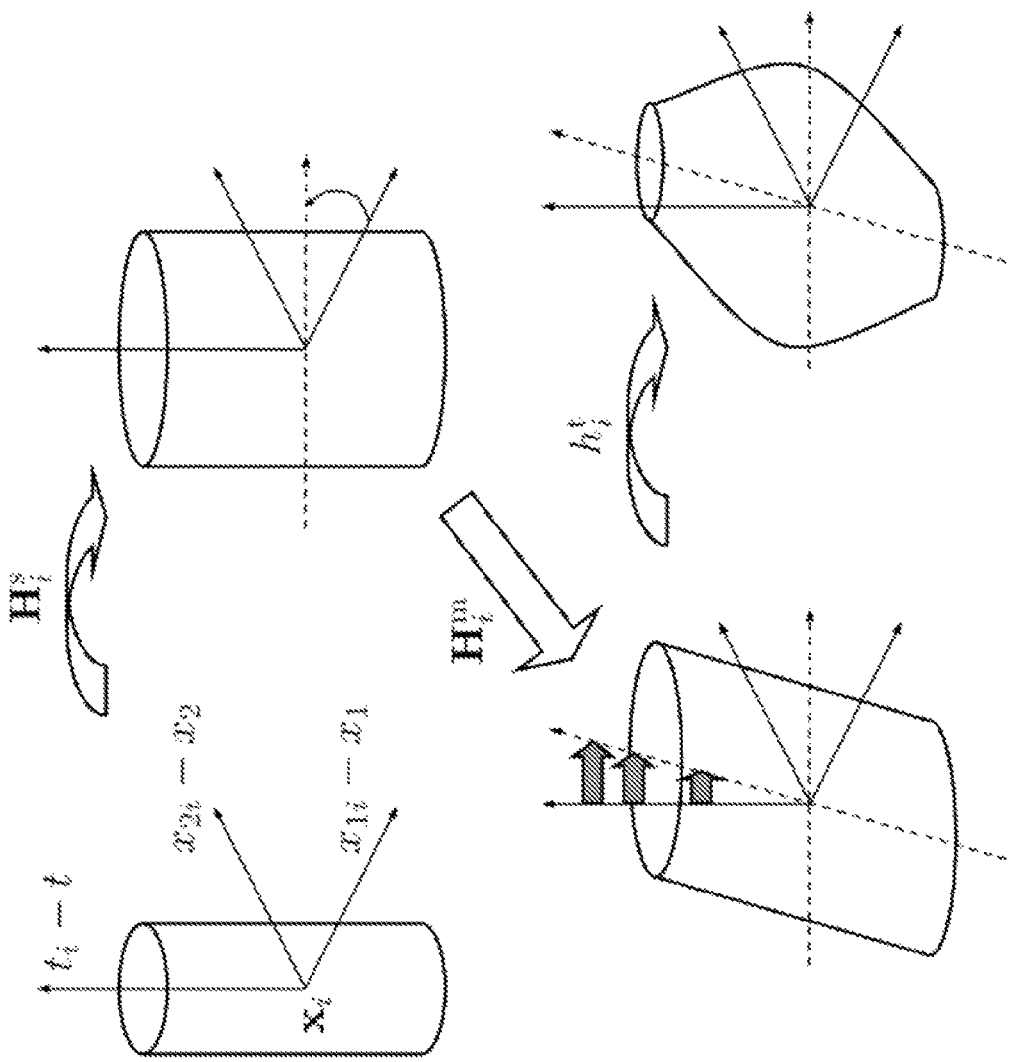
FIG. 2 illustrates a schematic representation of a motion-aligned steering kernel.

Referring to FIG. 2, a motion-aligned spatio-temporal kernel (MASK) may be constructed as follows:

$$K_{MASK}(\bullet) \equiv K_{H_i^s}(H_i^m(x_i-x))K_{h_i^t}(y_i-t), \quad (12)$$

where $H_i^s$ is a 3×3 spatial steering matrix, $H_i^m$ is a 3×3 motion steering matrix, and $h_i^t$ is a temporal steering parameter. These steering matrices (and parameter) are data-dependent, corresponding to the $i^{th}$ sample $x_i$. In other words, the steering kernel function $K_{MASK}(\bullet)$ is adapted to the local data. The overall kernel is a product of a spatial- and a motion-steering kernel, and an optional kernel that acts temporally. The kernel components, determining the steering action, are described in the following.

The spatial steering matrix $H_i^s$ may be defined by:

$$H_i^s = h^s \begin{bmatrix} C_i^s & \\ & 1 \end{bmatrix}^{-\frac{1}{2}}, \quad (13)$$

where $h^s$ is a global smoothing parameter, and $C_i^s$ is a 2×2 (symmetric) covariance matrix capturing the spatial variations in the sample values in a local neighborhood around sample $x_i$. This matrix may be constructed in a parametric manner on the basis of the following parameters: an orientation angle parameter $\theta_i$ that determines rotation of the kernel in the spatial $(x_1,x_2)$ plane, an elongation parameter $\sigma_i$ that determines spatial elongation of the kernel along its spatial axes, and a scaling parameter $\gamma_i$ that determines local spatial scaling.

The second major component of equation (12), the motion steering matrix $H_i^m$, may be constructed on the basis of a local estimate of the motion vector (or optical flow vector) $m_i=[m_{1i},m_{2i}]^T$:

$$H_i^m = \begin{bmatrix} 1 & 0 & -m_{1i} \\ 0 & 1 & -m_{2i} \\ 0 & 0 & 0 \end{bmatrix}, \quad (13)$$

This warps the kernel along the local motion trajectory by a shearing transformation (see FIG. 2). Assuming a spatial kernel was used with elliptical shape, this component by itself results in a spatio-temporal kernel with the shape of a tube or cylinder with elliptical cross-sections at any time instance t. Also, due to the motion alignment, the center point of each such elliptical cross-section moves in time along the motion path.

The final, optional, component of equation (12) is a temporal kernel that provides temporal penalization. Without this term, different samples that are located exactly on the motion trajectory but in different frames are weighted identically. With this term, data samples from different frames are weighted differently. A natural approach is to weight samples in frames close to the frame containing the sample of interest more strongly and to weight samples in frames that are further away less strongly. The relative temporal extent of the kernel may be controlled by the temporal scaling parameter $h_i^t$. This parameter may be adjusted locally in a data-adaptive manner, based on the estimation of the local motion vector $m_i$. Namely, the parameter can be adapted based on the reliability of the motion vector estimate, or on the basis of a confidence measure related to the motion estimate. For example, one may determine this parameter on the basis of the expected error in the local motion estimate. Or one may determine this parameter on the basis of the strength of the correlation of the data along the estimated motion trajectory.

If the confidence measure indicates high reliability of the motion estimate, the temporal smoothing parameter can be adjusted so that samples (pixels) from frames other than the current frame have a weight that is close to the weight given to samples from the current frame. If, on the other hand, the confidence measure indicates low reliability of the motion estimate, the temporal smoothing parameter can be adjusted so that samples from frames other than the current frame have a smaller weight, and such that the weight decreases more quickly with increasing distance in time. Effectively, this temporal penalization provides a graceful, robust and local fall-back from multi-frame processing to single-frame processing. Temporal support for the estimator can be narrowed in case the data violates the underlying motion model. Such may be the case, for example, in areas of occlusion, in areas with extremely fast motion, or in areas with erratic motion. Alternatively, the temporal smoothing parameter can be controlled globally.

The motion-aligned steering kernel and the action of its components is illustrated in FIG. 2. The top-left portion of FIG. 2 shows an example of the shape of a basic kernel centered on $x_i$. The result of spatial steering with $H_i^s$ is shown in the top-right portion of FIG. 2. The kernel is elongated, scaled and rotated in the spatial dimensions $x_1$ and $x_2$. The result of motion steering with $H_i^m$ is shown in the bottom-left portion of FIG. 2, illustrating the shearing action. Finally, the result of temporal scaling with $h_i^t$ is shown in the bottom-right portion of FIG. 2. Note that FIG. 2 only shows iso-surfaces of the motion-aligned steering kernel in order to illustrate its shape; the actual kernel weights may extend throughout the space and vary in strength.

Figure 3:
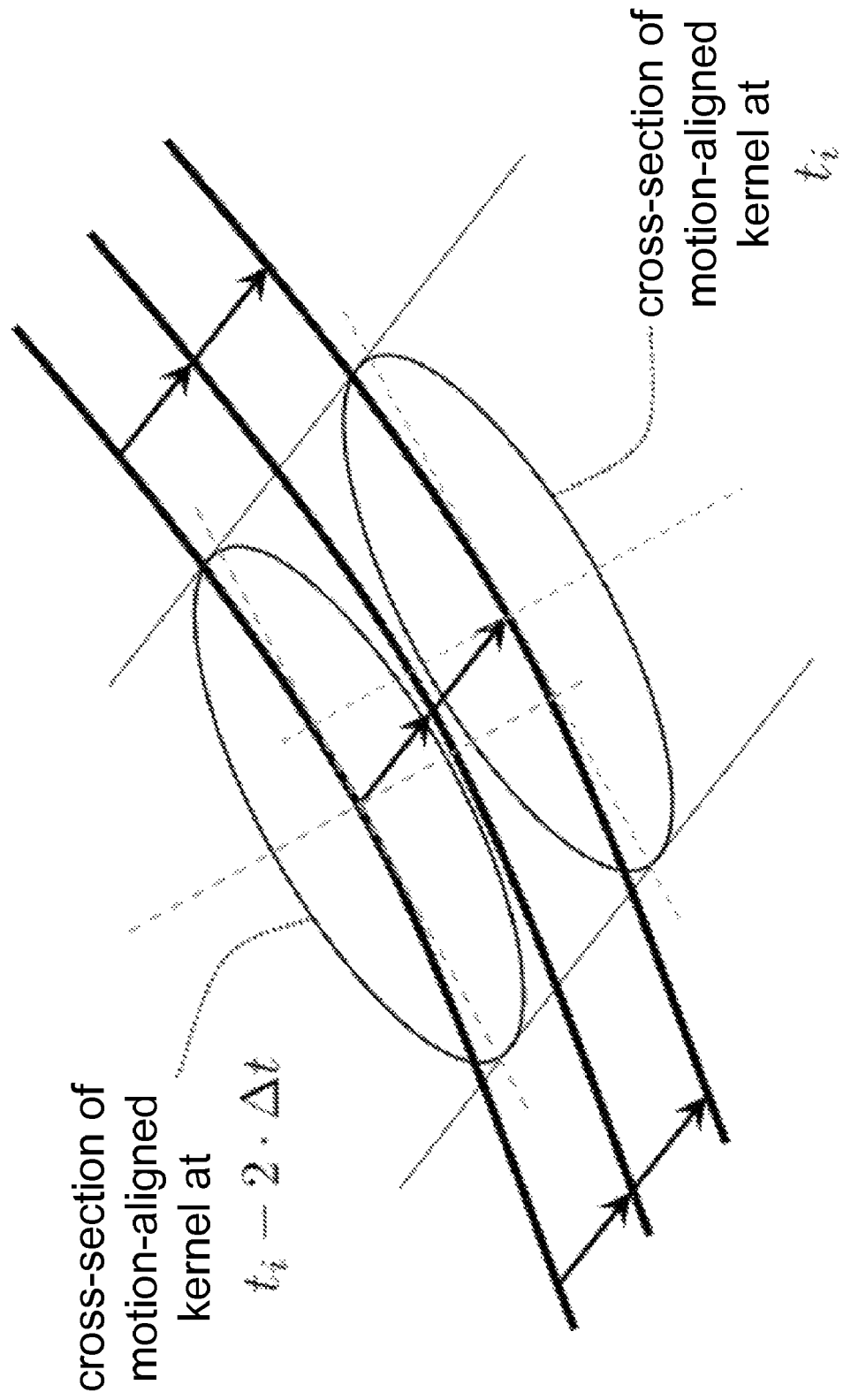
FIG. 3 illustrates the motion-aligned steering kernel in the example of the moving edge of FIG. 1, when spatial steering and motion steering are applied.
Figure 4:
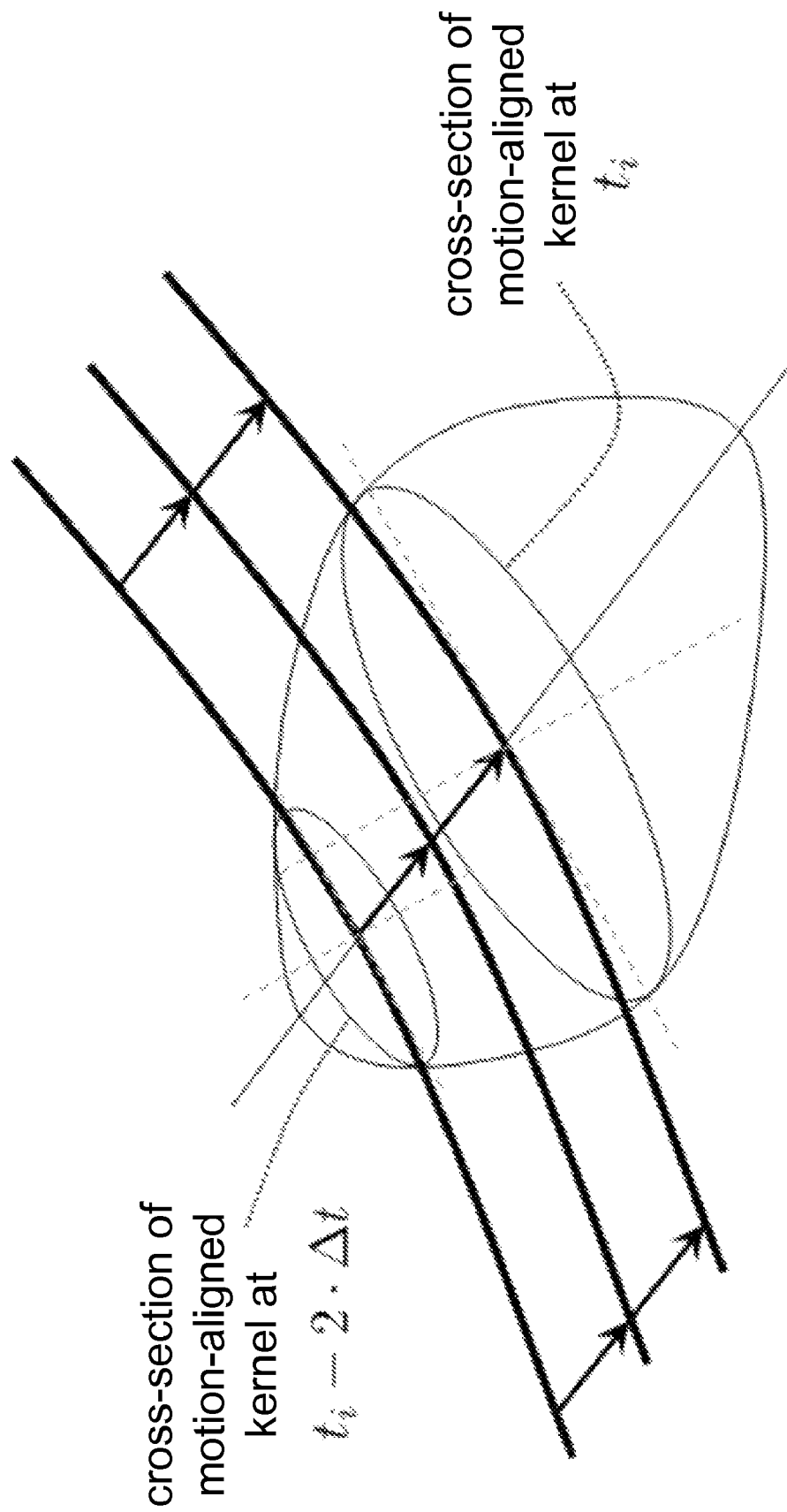
FIG. 4 illustrates the motion-aligned steering kernel in the example of the moving edge of FIG. 1, when spatial steering, motion steering and temporal steering are applied.

Illustrations of the motion-aligned steering kernel in the example of the moving edge of FIG. 1 are shown in FIG. 3 and FIG. 4. FIG. 3 illustrates the kernel when the spatial and motion steering are applied (i.e., without temporal scaling). FIG. 4 illustrates the kernel when the (optional) temporal scaling is applied as well. Note again that these schematic figures only show iso-surfaces and cross-sections of the kernel (not the actual weights). The figures illustrate the case of a strong edge with a dominant orientation in the local pixel data. The example kernel is elongated and rotated in the spatial dimensions so as to spread along the edge contour. This may result in spatially directional noise suppression and directional interpolation of the pixel data. Furthermore, the example kernel is spatio-temporally aligned with the motion trajectory. This may result in a multi-frame estimator, which enables temporal frame rate conversion and can result in spatial resolution enhancement, as well as improved noise suppression. FIG. 4 shows an example kernel with temporal scaling, illustrating local control over the temporal support of the estimator.

The overall motion-aligned kernel $K_{MASK}(\bullet)$ is a product of a spatial- and motion-steering kernel $K_{H_i^s}(H_i^m(x_i-x))$, and a temporal kernel $K_{h_i^t}(t_i-t)$. Each of these kernels can be constructed on the basis of, for example, a Gaussian function, a rectangular function, an exponential function, etc.

The computation of the spatial steering information ($C_i^s$ or $H_i^s$) will now be discussed. Local spatial orientations and variations of the data are captured by the local spatial gradients and their covariance. To this end, let $G_i$ contain local estimates of the spatial gradients. That is:

$$G_i = \begin{bmatrix} \vdots & \vdots \\ \hat{z}_{x_1}(x_j) & \hat{z}_{x_2}(x_j) \\ \vdots & \vdots \end{bmatrix}, x_j \in w_i. \quad (14)$$

where $\hat{z}_{x_1}(x_j)$ and $\hat{z}_{x_2}(x_j)$ are initial estimates of the first derivatives of $z(\bullet)$ along $x_1$ and $x_2$ at samples $x_j$, and $w_i$ is a local analysis window around $x_i$. The analysis window $w_i$ can be a 2-D (single-frame) window; alternatively, $w_i$ can be a 3-D (multi-frame) window. A robust estimate of $C_i^s$ can be computed on the basis of the singular value decomposition (SVD) of $G_i$. This provides the 2×1 (right-)singular vectors $v_{1i}$, $V_{2i}$ and the singular values $s_{1i}$, $s_{2i}$, encoding the local spatial orientation $\theta_i$ and its dominance. Spatial elongation parameters $\sigma_{1i}$ and $\sigma_{2i}$ determine the elongation of the kernel along the $x_1$ and $x_2$ axis, respectively, and may be computed by:

$$\sigma_{1i} = \sigma_{2i}^{-1} = \frac{s_{1i} + \lambda'}{s_{2i} + \lambda'}, \quad (15)$$

where $\lambda'$ is a constant for purposes of regularization. A spatial scaling parameter $\gamma_i$ determines an overall scaling in the spatial dimensions, and may be computed by:

$$\gamma_i = \left(\frac{s_{1i}s_{2i} + \lambda''}{M}\right)^\alpha. \quad (16)$$

M is the number of samples in the local analysis window, $\alpha$ is a local structure sensitivity parameter, and $\lambda''$ is another constant for regularization. Finally, the estimate of the spatial covariance matrix may be expressed as:

$$\hat{C}_i^s = \gamma_i(\sigma_{1i}v_{1i}v_{1i}^T + \sigma_{2i}v_{2i}v_{2i}^T). \quad (17)$$

Alternatively, the spatial orientation, elongation and scale may be computed on the basis of other estimation techniques.

The computation of the motion steering information $H_i^m$ and the temporal steering parameter $h_i^t$ will now be discussed. A variety of different methods for estimating motion (optical flow) may be utilized. It may be desirable for the motion estimation technique that is utilized to provide an estimate of the local motion vector (or optical flow vector) $m_i$ at the given sample locations $x_i$. In addition, it may be desirable for the technique to provide an estimate of the strength or reliability $\rho_i$ of each estimated local motion vector, i.e., a confidence measure may be associated with each motion estimate.

One possible approach is to utilize a gradient-based technique, also called a differential technique. In this technique, motion estimates may be computed from local spatial and temporal derivatives. This may involve solving the following system of constraints:

$$G_i m_i + g_i = 0, \quad (18)$$

where $G_i$ contains estimates of spatial derivatives, as defined by equation (14), and $g_i$ contains estimates of temporal derivatives of $z(\bullet)$ in an analysis window $w_i$.

$$g_i = [\hat{z}_t(x_1), \ldots \hat{z}_t(x_j), \ldots \hat{z}_y(x_M)]^T, x_j \in w_i. \quad (19)$$

This system of constraints can be solved in the least-squares sense. Furthermore, a confidence measure $\rho_i$ in the estimate can be derived on the basis of the residual error. Subsequently, the temporal scale parameter $h_i^t$ may be determined from $\rho_i$.

Other robust 2-D motion estimation methods may be used as an alternative. For example, so-called block-based methods, such as block-matching, may be used.

Figure 5:
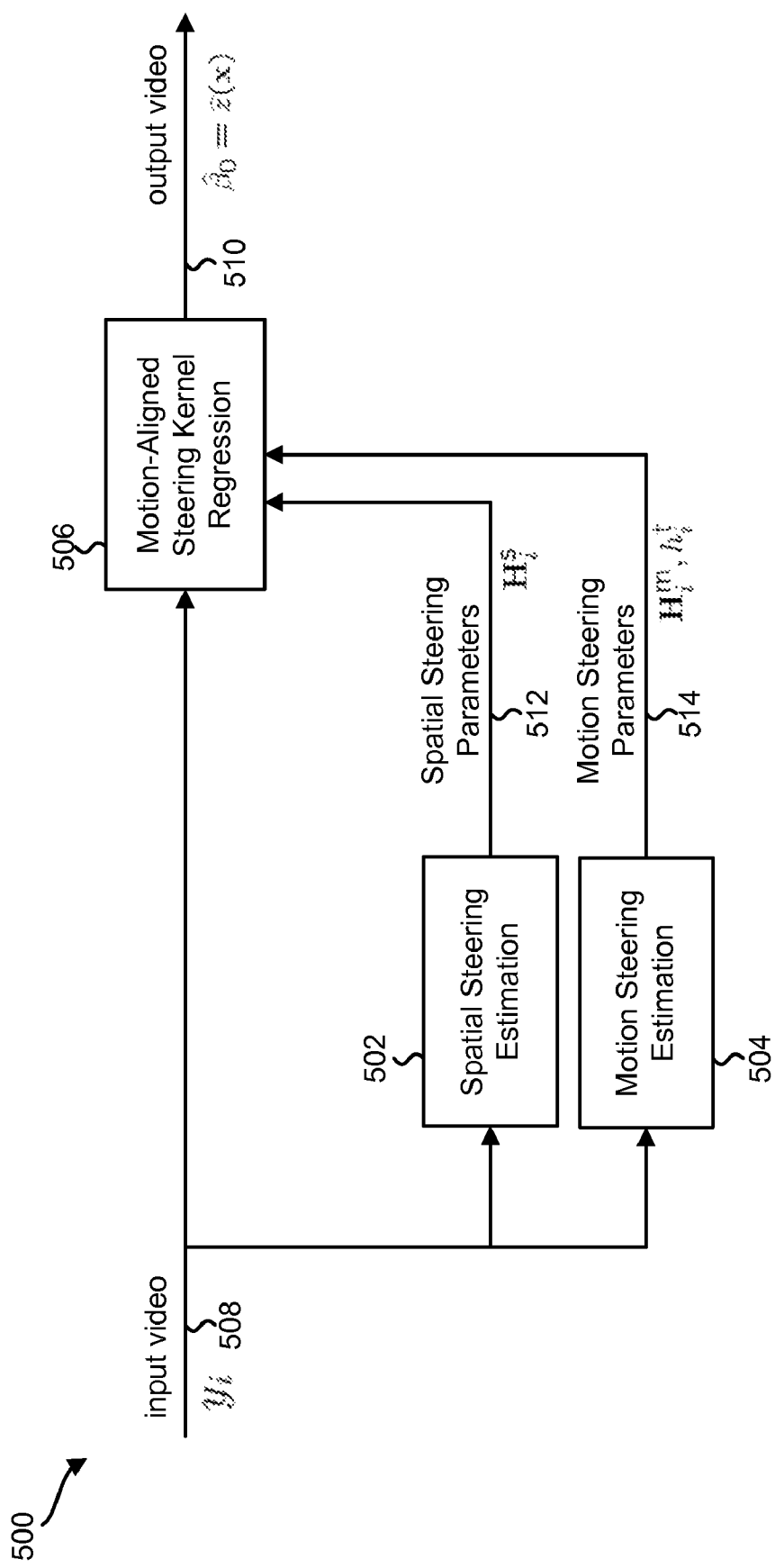
FIG. 5 illustrates a system for spatio-temporal video processing based on motion-aligned spatio-temporal steering kernel regression.

Various systems and methods for spatio-temporal video processing based on motion-aligned spatio-temporal steering kernel regression will be described. Referring initially to FIG. 5, there is shown a system 500 for spatio-temporal video processing based on motion-aligned spatio-temporal steering kernel regression. The system 500 is shown with a spatial steering estimation component 502, a motion steering estimation component 504, and a motion-aligned steering kernel regression component 506.

Input video data 508 may be provided to the spatial steering estimation component 502, the motion steering estimation component 504, and the motion-aligned steering kernel regression component 506. The pixels (samples) in the input video data 508 may correspond to $y_i$ in the mathematical description provided above.

The spatial steering estimation component 502 and the motion steering estimation component 504 may estimate local spatio-temporal steering parameters at pixels in the input video data 508. More specifically, the spatial steering estimation component 502 may estimate spatial steering parameters 512, and the motion steering estimation component 504 may estimate motion steering parameters 514.

The spatial steering parameters 512 may include an angle parameter $\theta_i$ (alternatively represented by singular vectors $v_1$ and $v_2$), elongation parameters $\sigma_{1,i}$ and $\sigma_{2,i}$, and a scaling parameter $\gamma_i$. The local spatial steering parameters 512 at pixel $x_i$ may be captured by a covariance matrix $C_i^s$, which in turn may be used to compute the spatial steering matrix $H_i^s$.

The motion steering (and temporal steering) parameters 514 may include a local motion vector or optical flow vector $m_i = [m_{1i}, m_{2i}]^T$ and a temporal scaling parameter $h_i^t$. The motion vector at pixel $x_i$ may be captured by a motion steering matrix $H_i^m$.

The motion-aligned steering kernel regression component 506 may use the spatial steering parameters 512 and the motion steering parameters 514 to apply motion-aligned spatio-temporal steering kernel regression to the input video data 508. This may be done for the purpose of upscaling the input video data 508 and/or performing noise suppression with respect to the input video data 508. Upscaling may be along any dimension, in particular spatially, temporally or spatio-temporally. Motion-aligned spatio-temporal steering kernel regression can be applied to reconstruct data on a regular grid (as is often the case for video upscaling) or on an irregular grid.

The motion-aligned steering kernel regression component 506 may output video data 510 that includes estimated pixel values. The estimated pixel values in the output video data 510 may correspond to $\hat{\beta}_0=\hat{z}(x)$ in the mathematical description provided above.

Figure 6:
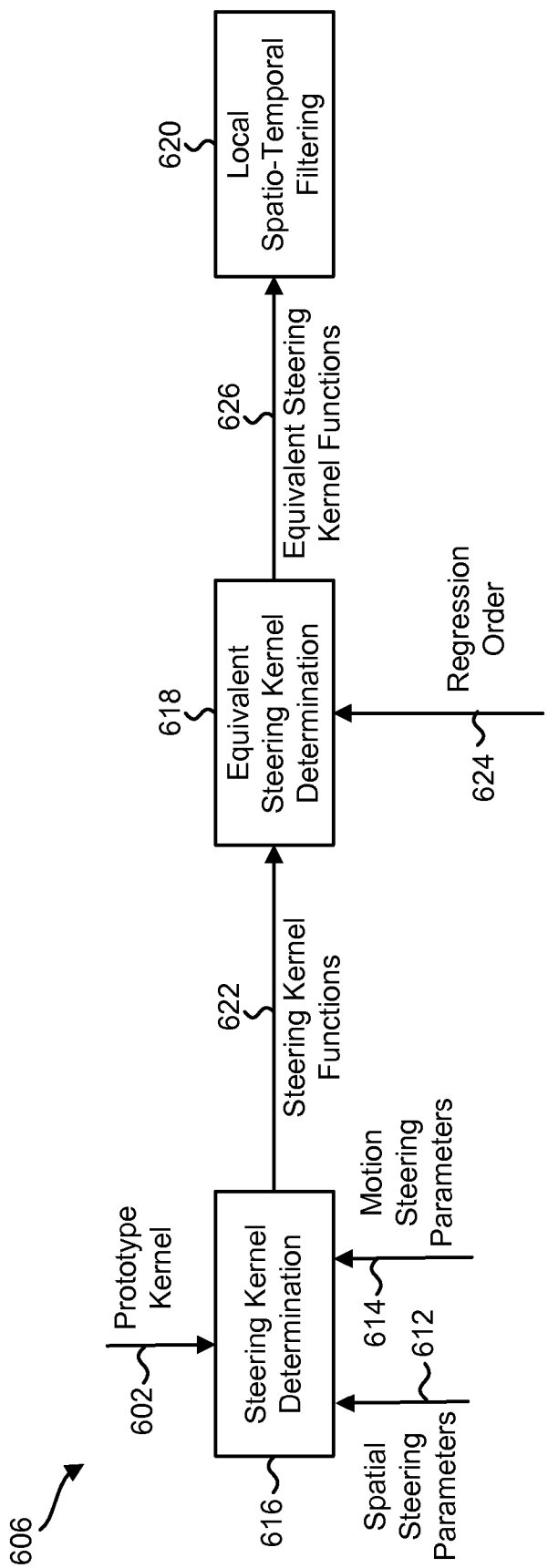
FIG. 6 illustrates a motion-aligned steering kernel regression component.

FIG. 6 illustrates a motion-aligned steering kernel regression component 606. The motion-aligned steering kernel regression component 606 is shown with a steering kernel determination component 616, an equivalent steering kernel determination component 618, and a local spatio-temporal filtering component 620.

The steering kernel determination component 616 may determine steering kernel functions 622 based on a prototype kernel 602, spatial steering parameters 612, and motion steering parameters 614. The steering kernel functions 622 may correspond to $K_{MASK}(\bullet)$ in the above mathematical description.

The equivalent steering kernel determination component 618 may determine equivalent steering kernel functions 626 for pixels in the input video data 508. The equivalent steering kernel functions 626 may be based on the steering kernel function 622 and also based on a regression order 624. The equivalent steering kernel functions 626 may correspond to $W_i(x; H_i^s, H_i^m, h_i^t, K, N)$ in the above mathematical description. The equivalent steering kernel function $W_i(\bullet)$ is specific to the pixel at $x_i$.

The local spatio-temporal filtering component 620 may perform local spatio-temporal filtering of the pixels in the input video data 508 using the equivalent steering kernel functions 626. The local spatio-temporal filtering may be performed in accordance with the following equation:

$$\hat{z}(x) = \sum_{i=1}^{P} W_i(x; H_i^s, H_i^m, h_i^t, K, N) y_i. \quad (20)$$

Figure 7:
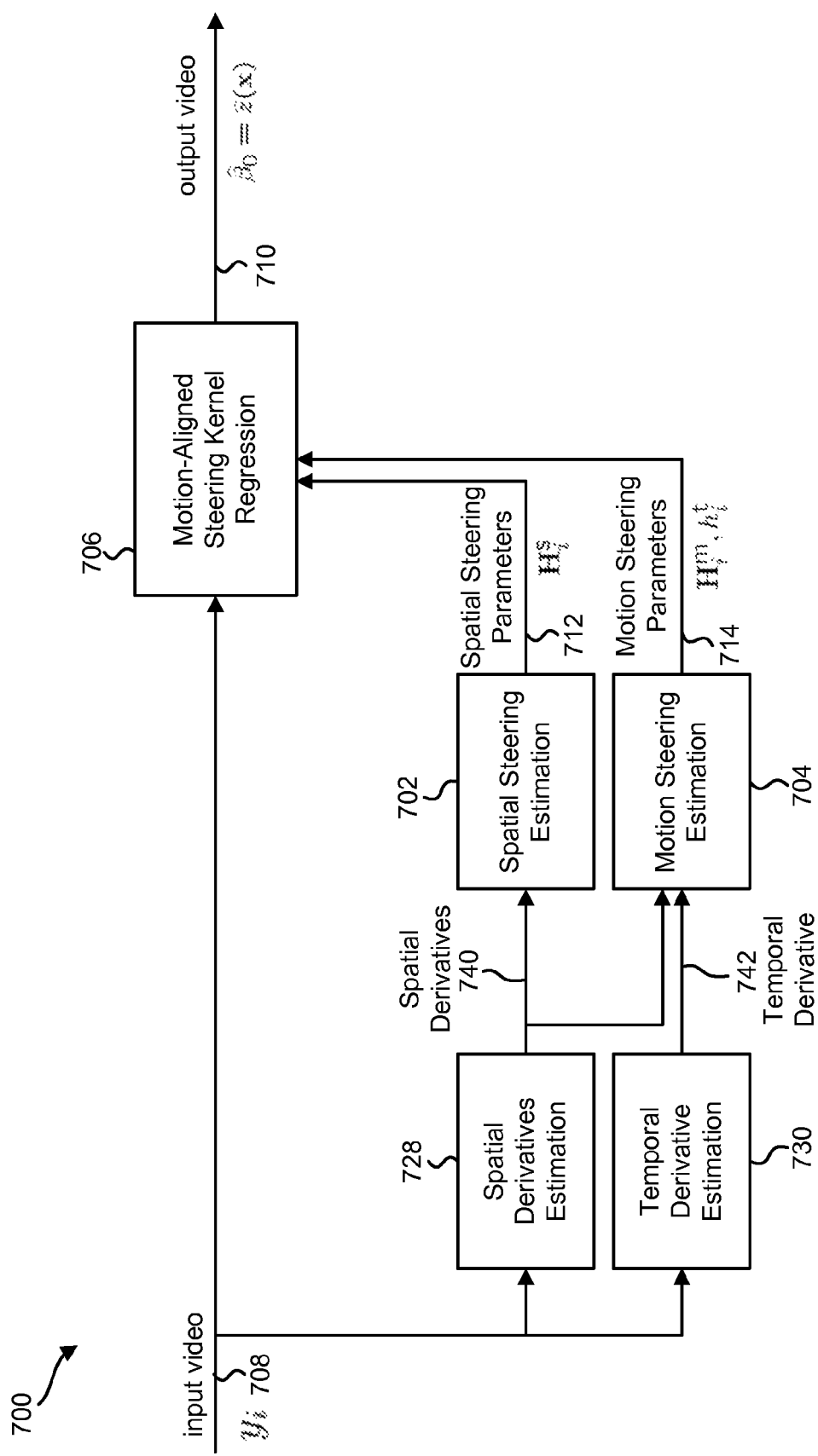
FIG. 7 illustrates another system for spatio-temporal video processing based on motion-aligned spatio-temporal steering kernel regression, where both the spatial steering estimation and the motion steering estimation processes are derivative-based.

FIG. 7 illustrates another system 700 for spatio-temporal video processing based on motion-aligned spatio-temporal steering kernel regression. In the system 700 that is shown in FIG. 7, both the spatial steering estimation and the motion steering estimation processes are derivative-based (e.g., gradient-based or differential) techniques. The system 700 is shown with a spatial derivatives estimation component 728, a temporal derivative estimation component 730, a spatial steering estimation component 702, a motion steering estimation component 704, and a motion-aligned steering kernel regression component 706.

Input video data 708 may be provided to the spatial derivatives estimation component 728. The spatial derivatives estimation component 728 may estimate spatial derivatives 740 with respect to the input video data 708. The spatial derivatives 740 may be provided to the spatial steering estimation component 702 for use in estimating spatial steering parameters 712. The spatial derivatives 740 may also be provided to the motion steering estimation component 704 for use in estimating motion steering parameters 714.

The input video data 708 may also be provided to the temporal derivative estimation component 730. The temporal derivative estimation component 730 may estimate a temporal derivative 742 with respect to the input video data 708. The temporal derivative 742 may be provided to the motion steering estimation component 704 for use in estimating the motion steering parameters 714.

The spatial derivatives 740 and the temporal derivative 742 may be spatio-temporal gradient data $\hat{z}_{x_1}(\bullet), \hat{z}_{x_2}(\bullet), \hat{z}_t(\bullet)$. This gradient estimation process may be based on classic kernel regression (i.e., without steering). This estimation process may alternatively be based on the use of image derivative operators, for example derivative-of-Gaussian filters, or other filters, or other techniques known in the art.

As indicated above, the 2-D spatial steering estimation process may be based on the spatial derivatives 740 (e.g., the spatial gradient data). This may involve applying singular value decomposition (SVD) on the spatial gradient data in a local window. Alternatively, the process may be based on computing or searching for least-squared-error or least-absolute-error estimates of the orientation, or by computing eigenvalues of a matrix, or other techniques, based on the spatial gradient.

As indicated above, the motion steering estimation process may be based on both the spatial derivatives 740 and the temporal derivative 742 (gradient-based). This process may be based on computing or searching for least-squared-error or least-absolute-error estimates of the motion vector, given the samples of the spatio-temporal derivatives in a local window. A confidence measure may be computed and used to control the temporal scaling parameter.

The motion-aligned steering kernel regression component 706 may use the spatial steering parameters 712 and the motion steering parameters 714 to apply motion-aligned spatio-temporal steering kernel regression to the input video data 708. This may be done for the purpose of upscaling the input video data 708 and/or performing noise suppression with respect to the input video data 708. The motion-aligned steering kernel regression component 706 may output video data 710 that includes estimated pixel values.

Optionally, the spatio-temporal steering kernel regression process can compute new estimates of the local spatio-temporal derivatives 740, 742 (in addition to estimates of the pixel values themselves). These new derivative estimates may be improved estimates, because they were calculated using steering. It is then possible to re-estimate (or refine) the previously computed local steering parameters and the steering matrices. These can then be used to apply spatio-temporal steering kernel regression again, to obtain a result that is improved further in terms of visual quality. This procedure can be iterated, which is called iterative steering kernel regression.

The systems and methods described above may be applied to video data, y, consisting of a single component, such as graylevel or intensity data. However, image and video data often consists of multiple color components, such as luminance and chrominance components, or RGB (red, green, blue) color components. In this case, it may be convenient to compute the steering parameters based on a single color component, for example luminance or luma Y. This may then involve a color conversion from RGB data to luminance or luma Y. A suitable conversion matrix may be applied to compute luminance data. Subsequently, spatio-temporal derivatives estimation, spatial steering estimation and motion steering estimation may be applied to the luminance data, to compute steering parameters at each pixel. Finally, motion-aligned steering kernel regression can be applied to each of the red, green and blue components ($y_R$, $y_G$, $y_B$) separately.

Figure 8:
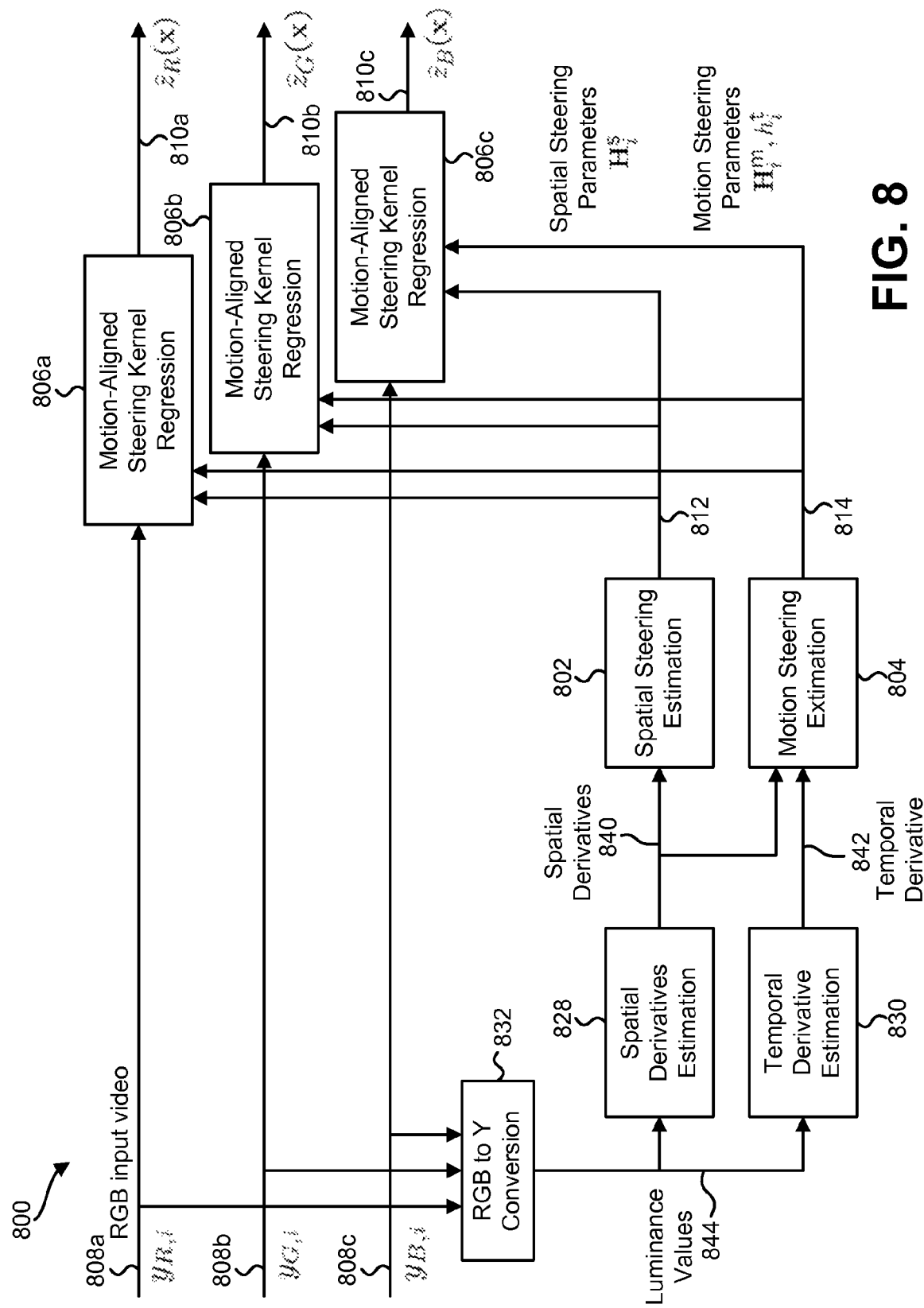
FIG. 8 illustrates a system for spatio-temporal video processing based on motion-aligned spatio-temporal steering kernel regression, where the system may be used to process RGB video data.

FIG. 8 illustrates another system 800 for spatio-temporal video processing based on motion-aligned spatio-temporal steering kernel regression. The depicted system 800 may be used to process RGB video data 808.

The system 800 is shown with a red-green-blue to luminance (RGB-to-Y) conversion component 832, a spatial derivatives estimation component 828, a temporal derivative estimation component 830, a spatial steering estimation component 802, and a motion steering estimation component 804. The system 800 is also shown with first, second, and third motion-aligned steering kernel regression components 806a, 806b, 806c that correspond to a red component 808a, a green component 808b, and a blue component 808c of the RGB video data 808, respectively.

The red component 808a, green component 808b, and blue component 808c of the RGB video data 808 may be provided to the RGB-to-Y conversion component 832. The RGB-to-Y conversion component 832 may convert these components 808a, 808b, 808c of the RGB video data 808 to luminance values 844. The luminance values 844 may be provided to the spatial derivatives estimation component 828 and to the temporal derivative estimation component 830.

The spatial derivatives estimation component 828 may estimate spatial derivatives 840 with respect to the luminance values 844. The spatial derivatives 840 may be provided to the spatial steering estimation component 802 for use in estimating spatial steering parameters 812. The spatial derivatives 840 may also be provided to the motion steering estimation component 804 for use in estimating motion steering parameters 814.

The temporal derivative estimation component 830 may estimate a temporal derivative 842 with respect to the luminance values 844. The temporal derivative 842 may be provided to the motion steering estimation component 804 for use in estimating the motion steering parameters 814.

The first motion-aligned steering kernel regression component 806a may use the spatial steering parameters 812 and the motion steering parameters 814 to apply motion-aligned spatio-temporal steering kernel regression to the red component 808a of the RGB video data 808. The second motion-aligned steering kernel regression component 806b may use the spatial steering parameters 812 and the motion steering parameters 814 to apply motion-aligned spatio-temporal steering kernel regression to the green component 808b of the RGB video data 808. The third motion-aligned steering kernel regression component 806c may use the spatial steering parameters 812 and the motion steering parameters 814 to apply motion-aligned spatio-temporal steering kernel regression to the blue component 808c of the RGB video data 808.

The output of the first motion-aligned steering kernel regression component 806a may be the red component 810a of the output video data 810. The output of the second motion-aligned steering kernel regression component 806b may be the green component 810b of the output video data 810. The output of the third motion-aligned steering kernel regression component 806c may be the blue component 810c of the output video data 810.

As shown in FIG. 8, the same steering parameters 812, 814 can be used for each of the color components. At the same time, the actual steering kernel regression processes themselves for the different color components can be applied independently. This may reduce computational complexity.

Alternatively, the spatio-temporal derivatives estimation and spatio-temporal steering estimation stages can be applied on a component in a different color space, such as Lab, Luv, or other color spaces. Furthermore, in the case where the video data is already available in a suitable color space, such as YCbCr, color conversion may not be necessary. In that case, steering parameter estimation can be performed directly on the luminance data Y; also, final steering kernel regression can be performed separately on the luminance Y and chrominance Cb and Cr components.

Figure 9:
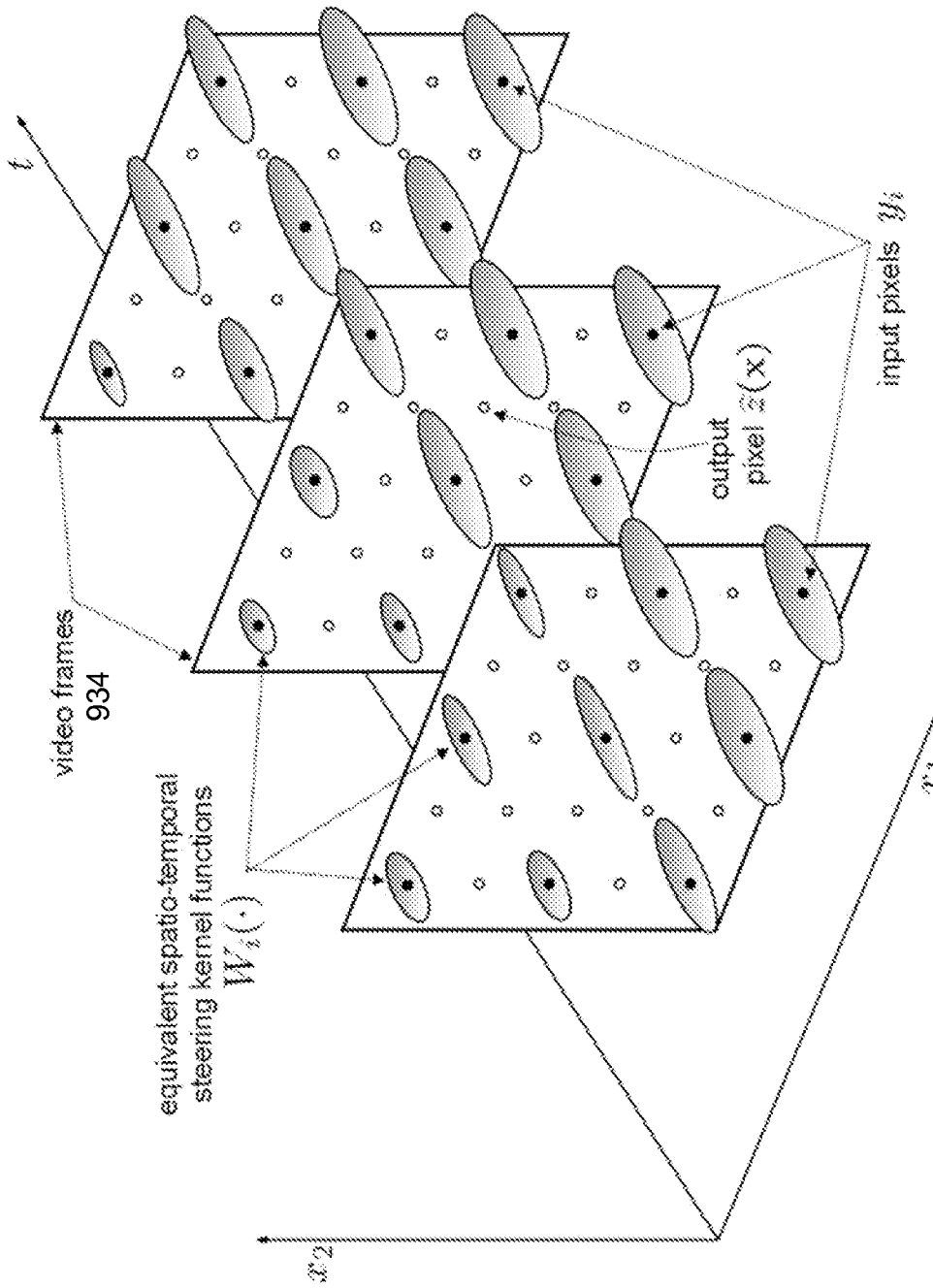
FIG. 9 illustrates an example of motion-aligned spatio-temporal steering kernel regression at the pixel level.

FIG. 9 illustrates an example of motion-aligned spatio-temporal steering kernel regression at the pixel level. This example illustrates the case of spatial upscaling of video data, consisting of a sequence of video frames 934, by a factor of two in each spatial dimension (i.e., horizontally and vertically).

FIG. 9 shows a local view of a small spatio-temporal window of pixels. The locations of input pixels $x_i$ are indicated with solid dots, having pixel values $y_i$. The locations of output pixels that are not in the input are indicated with hollow dots, with output pixel values $\hat{z}(\bullet)$ that may be estimated using interpolation by steering kernel regression. The existing input pixels can also be processed by steering kernel regression, and so these may become output pixels as well.

The final estimated value $\hat{z}(x)$ for the output pixel at x may be a weighted average of pixel values $y_i$ of pixels in a spatio-temporal neighborhood of x. This may include pixels from multiple video frames 934. The weight of each input pixel may be determined by $W_i(x_i-x)$, where $W_i(\bullet)$ is the equivalent motion-aligned steering kernel function associated with the input pixel at $x_i$. This function may be determined by the steering parameters, as well as the regression order N.

The equivalent steering kernel functions are illustrated in FIG. 9 with small ellipses. The ellipses in these diagrams are illustrative only of the approximate shape and orientation of the kernel functions, but not of their actual size. That is, their influence may extend to other pixels; however, the strength of this influence may be strongly adapted and directed using the steering parameters. This may result in giving higher weights to the important pixels in the spatio-temporal neighborhood, while giving lower weights to less important pixels.

Figure 10:
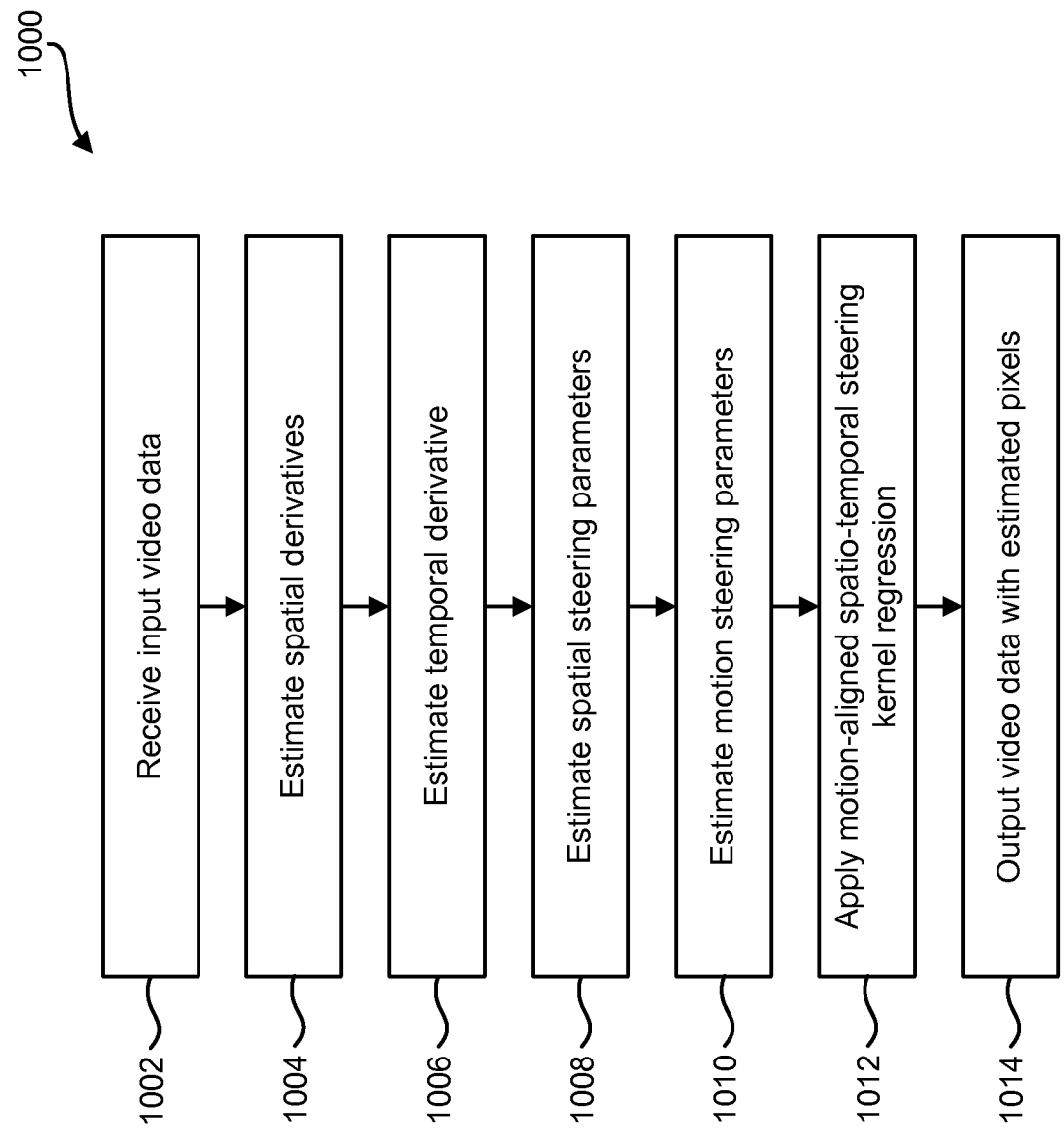
FIG. 10 illustrates a method for spatio-temporal video processing based on motion-aligned spatio-temporal steering kernel regression.

FIG. 10 illustrates a method 1000 for spatio-temporal video processing based on motion-aligned spatio-temporal steering kernel regression. In accordance with the method 1000, input video data 708 may be received 1002. The method 1000 may include estimating 1004 spatial derivatives 740 with respect to the input video data 708. The method 1000 may also include estimating 1006 a temporal derivative 742 with respect to the input video data 708. The spatial derivatives 740 and the temporal derivative 742 may be spatio-temporal gradient data $\hat{z}_{x_1}(\bullet)$, $\hat{z}_{x_2}(\bullet)$, $\hat{z}_t(\bullet)$.

The method 1000 also may include using the spatio-temporal derivatives 740, 742 to estimate local spatio-temporal steering parameters at pixels in the input video data 708. More specifically, spatial steering parameters 712 may be estimated 1008. Motion steering parameters 714 may also be estimated 1010.

The spatial steering estimation process may be based on the spatial derivatives 740. The spatial steering parameters 712 may include an angle parameter $\theta_i$ (alternatively represented by singular vectors $v_1$ and $v_2$), elongation parameters $\sigma_{1,i}$ and $\sigma_{2,i}$, and a scaling parameter $\gamma_i$. The local spatial steering parameters 712 at pixel $x_i$ may be captured by a covariance matrix $C_i^s$, which in turn may be used to compute the spatial steering matrix $H_i^s$.

The motion steering estimation process may be based on both the spatial derivatives 740 and the temporal derivative 742. The motion steering parameters 714 may include a local motion vector or optical flow vector $m_i=[m_{1,i},m_{2,i}]^T$ and a temporal scaling parameter $h_i^t$. The motion vector at pixel $x_i$ may be captured by a motion steering matrix $H_i^m$.

The spatial steering parameters 712 and the motion steering parameters 714 may be used to apply 1012 motion-aligned spatio-temporal steering kernel regression to the input video data 708. This may be done for the purpose of upscaling the input video data 708 and/or performing noise suppression with respect to the input video data 708. Applying 1012 the motion-aligned spatio-temporal steering kernel regression may involve determining the steering kernel functions 622 ($K_{MASK}(\bullet)$ in the mathematical description provided above) given the steering parameters 712, 714; determining the equivalent steering kernel functions 626 ($W_i(x; H_i^s, H_i^m, h_i^t, K, N)$ in the mathematical description provided above); and finally performing local spatio-temporal filtering of the input video pixels using the equivalent steering kernel functions 626. The final filtering step may be performed in accordance with equation (20) above.

The method 1000 may also include outputting 1014 video data 710 that includes estimated pixel values. The estimated pixel values in the output video data 710 may correspond to $\hat{\beta}_0 = \hat{z}(x)$ in the mathematical description provided above.

Figure 11:
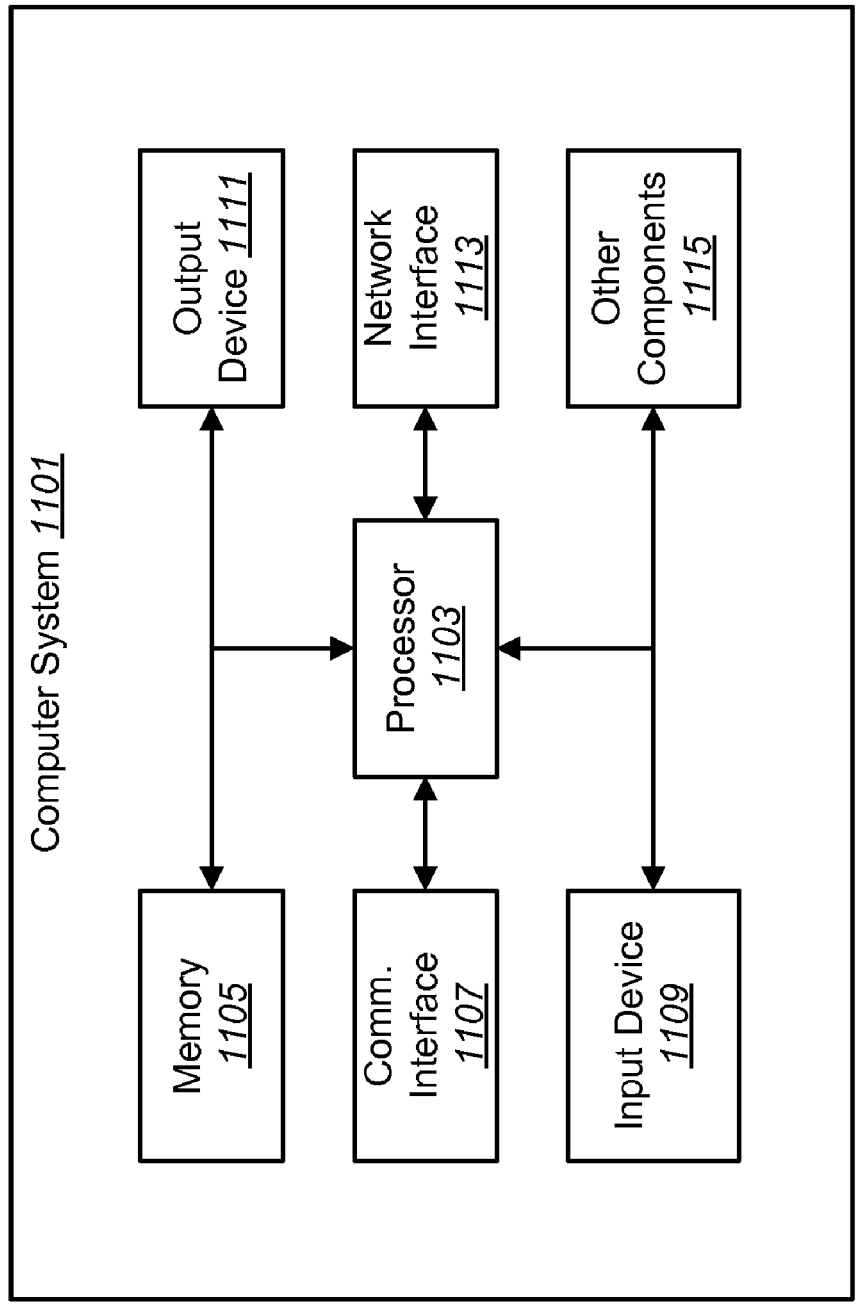
FIG. 11 illustrates various components that may be utilized in a computer system.

FIG. 11 illustrates various components that may be utilized in a computer system 1101. One or more computer systems 1101 may be used to implement the various systems and methods disclosed herein. The illustrated components may be located within the same physical structure or in separate housings or structures. Thus, the term computer or computer system 1101 is used to mean one or more broadly defined computing devices unless it is expressly stated otherwise. Computing devices include the broad range of digital computers including microcontrollers, hand-held computers, personal computers, servers, mainframes, supercomputers, minicomputers, workstations, and any variation or related device thereof.

The computer system 1101 is shown with a processor 1103 and memory 1105. The processor 1103 may control the operation of the computer system 1101 and may be embodied as a microprocessor, a microcontroller, a digital signal processor (DSP) or other device known in the art. The processor 1103 typically performs logical and arithmetic operations based on program instructions stored within the memory 1105. The instructions in the memory 1105 may be executable to implement the methods described herein.

The computer system 1101 may also include one or more communication interfaces 1107 and/or network interfaces 1113 for communicating with other electronic devices. The communication interface(s) 1107 and the network interface(s) 1113 may be based on wired communication technology, wireless communication technology, or both.

The computer system 1101 may also include one or more input devices 1109 and one or more output devices 1111. The input devices 1109 and output devices 1111 may facilitate user input. Other components 1115 may also be provided as part of the computer system 1101.

FIG. 11 illustrates only one possible configuration of a computer system 1101. Various other architectures and components may be utilized.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The various illustrative logical blocks, modules and circuits described herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described herein may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A computer-readable medium may be any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for video processing based on motion-aligned spatio-temporal steering kernel regression, comprising:
    estimating local spatio-temporal steering parameters at pixels in input video data, wherein estimating the local spatio-temporal steering parameters comprises estimating at least one spatial steering parameter and estimating at least one motion steering parameter;
    using the local spatio-temporal steering parameters to apply motion-aligned spatio-temporal steering kernel regression to the input video data to perform at least one of upscaling and noise suppression;
    estimating spatial derivatives, wherein spatial steering parameter estimation and motion steering parameter estimation both depend on the spatial derivatives; and
    estimating temporal derivatives, wherein the motion steering parameter estimation depends on the temporal derivatives.

2. The method of claim 1, wherein applying the motion-aligned spatio-temporal steering kernel regression to the input video data comprises:
    determining steering kernel functions, wherein the steering kernel functions are based on the local spatio-temporal steering parameters;
    determining equivalent steering kernel functions for pixels in the input video data, wherein the equivalent steering kernel functions are based on the steering kernel function and also based on a regression order; and
    performing local spatio-temporal filtering of the pixels in the input video data using the equivalent steering kernel functions.

3. The method of claim 2, wherein the local spatio-temporal filtering is performed as:

$$\hat{z}(x) = \sum_{i=1}^{P} W_i(x; H_i^s, H_i^m, h_i^t, K, N) y_i.$$

4. The method of claim 1, wherein the at least one spatial steering parameter comprises an angle parameter, elongation parameters, and a scaling parameter, and wherein the at least one motion steering parameter comprises a local motion vector and a temporal scaling parameter.

5. The method of claim 1, wherein the input video data comprises multiple color components, and wherein the motion-aligned spatio-temporal steering kernel regression is applied to each of the color components separately.

6. The method of claim 1, wherein the upscaling comprises at least one of: (i) spatial upscaling, (ii) temporal upscaling, and (iii) simultaneous spatial and temporal upscaling.

7. A computer system for video processing based on motion-aligned spatio-temporal steering kernel regression, comprising:
    a processor;
    memory in electronic communication with the processor; and
    instructions stored in the memory, the instructions being executable to:
        estimate local spatio-temporal steering parameters at pixels in input video data, wherein estimating the local spatio-temporal steering parameters comprises estimating at least one spatial steering parameter and estimating at least one motion steering parameter;
        use the local spatio-temporal steering parameters to apply motion-aligned spatio-temporal steering kernel regression to the input video data to perform at least one of upscaling and noise suppression;
        estimating spatial derivatives, wherein spatial steering parameter estimation and motion steering parameter estimation both depend on the spatial derivatives; and
        estimating temporal derivatives, wherein the motion steering parameter estimation depends on the temporal derivatives.

8. The computer system of claim 7, wherein applying the motion-aligned spatio-temporal steering kernel regression to the input video data comprises:
    determining steering kernel functions, wherein the steering kernel functions are based on the local spatio-temporal steering parameters;
    determining equivalent steering kernel functions for pixels in the input video data, wherein the equivalent steering kernel functions are based on the steering kernel function and also based on a regression order; and
    performing local spatio-temporal filtering of the pixels in the input video data using the equivalent steering kernel functions.

9. The computer system of claim 8, wherein the local spatio-temporal filtering is performed as:

$$\hat{z}(x) = \sum_{i=1}^{P} W_i(x; H_i^s, H_i^m, h_i^t, K, N) y_i.$$

10. The computer system of claim 7, wherein the at least one spatial steering parameter comprises an angle parameter, elongation parameters, and a scaling parameter, and wherein the at least one motion steering parameter comprises a local motion vector and a temporal scaling parameter.

11. The computer system of claim 7, wherein the input video data comprises multiple color components, and wherein the motion-aligned spatio-temporal steering kernel regression is applied to each of the color components separately.

12. The computer system of claim 7, wherein the upscaling comprises at least one of: (i) spatial upscaling, (ii) temporal upscaling, and (iii) simultaneous spatial and temporal upscaling.

13. A non-transitory computer-readable medium comprising executable instructions for:
    estimating local spatio-temporal steering parameters at pixels in input video data, wherein estimating the local spatio-temporal steering parameters comprises estimating at least one spatial steering parameter and estimating at least one motion steering parameter;
    using the local spatio-temporal steering parameters to apply motion-aligned spatio-temporal steering kernel regression to the input video data to perform at least one of upscaling and noise suppression;
    estimating spatial derivatives, wherein spatial steering parameter estimation and motion steering parameter estimation both depend on the spatial derivatives; and
    estimating temporal derivatives, wherein the motion steering parameter estimation depends on the temporal derivatives.

14. The computer-readable medium of claim 13, wherein applying the motion-aligned spatio-temporal steering kernel regression to the input video data comprises:
    determining steering kernel function, wherein the steering kernel functions are based on the local spatio-temporal steering parameters;

determining equivalent steering kernel functions for pixels in the input video data, wherein the equivalent steering kernel functions are based on the steering kernel function and also based on a regression order; and performing local spatio-temporal filtering of the pixels in the input video data using the equivalent steering kernel functions.

15. The computer-readable medium of claim 14, wherein the local spatio-temporal filtering is performed as:

$$\hat{z}(x) = \sum_{i=1}^{P} W_i(x; H_i^s, H_i^m, h_i^t, K, N) y_i.$$

16. The computer-readable medium of claim 13, wherein the at least one spatial steering parameter comprises an angle parameter, elongation parameters, and a scaling parameter, and wherein the at least one motion steering parameter comprises a local motion vector and a temporal scaling parameter.

17. The computer-readable medium of claim 13, wherein the input video data comprises multiple color components, and wherein the motion-aligned spatio-temporal steering kernel regression is applied to each of the color components separately.

18. The computer-readable medium of claim 13, wherein the upscaling comprises at least one of: (i) spatial upscaling, (ii) temporal upscaling, and (iii) simultaneous spatial and temporal upscaling.

* * * * *

UNITED STATES PATENT AND TRADEMARK OFFICE
CERTIFICATE OF CORRECTION

PATENT NO. : 8,264,614 B2
APPLICATION NO. : 12/016119
DATED : September 11, 2012
INVENTOR(S) : Petrus J. L. Van Beek et al.

It is certified that error appears in the above-identified patent and that said Letters Patent is hereby corrected as shown below:

In the Specifications:

In column 4, line 60 please delete "$t_i$ be estimated" and change it to --to be estimated--.

Signed and Sealed this
Third Day of September, 2013

Teresa Stanek Rea
*Acting Director of the United States Patent and Trademark Office*